(12) United States Patent
Riley

(10) Patent No.: US 9,578,852 B1
(45) Date of Patent: Feb. 28, 2017

(54) CHUTE FOR IMMOBILIZING ANIMALS

(76) Inventor: William S. Riley, Lubbock, TX (US)

( * ) Notice: Subject to any disclaimer, the term of this patent is extended or adjusted under 35 U.S.C. 154(b) by 1308 days.

(21) Appl. No.: 13/385,896

(22) Filed: Mar. 13, 2012

Related U.S. Application Data

(60) Provisional application No. 61/633,532, filed on Feb. 13, 2012.

(51) Int. Cl.
  *A01K 15/04* (2006.01)
  *A01K 1/06* (2006.01)
  *A01K 1/02* (2006.01)
  *A01K 15/00* (2006.01)

(52) U.S. Cl.
  CPC .......... *A01K 1/0613* (2013.01); *A01K 1/0236* (2013.01); *A01K 15/00* (2013.01); *A01K 15/04* (2013.01)

(58) Field of Classification Search
  CPC ...... A01K 15/02; A01K 29/00; A01K 1/0613; A01K 15/00; A01K 15/04; A01K 1/00; A01K 1/0236
  USPC ....... 119/712, 729, 731, 721, 722, 724, 751, 119/752, 400, 403, 413, 814
  See application file for complete search history.

(56) References Cited

U.S. PATENT DOCUMENTS

| | | | |
|---|---|---|---|
| 2,000,122 A | 5/1935 | Cameron | |
| 2,912,715 A | 11/1959 | Moss | |
| 3,095,858 A | 7/1963 | Bauer | |
| 3,115,670 A | 12/1963 | Hlavacek et al. | |
| 3,167,053 A | 1/1965 | McDaniel | |
| 3,319,608 A * | 5/1967 | Klooster | A01K 1/0613 119/723 |
| 3,590,784 A | 7/1971 | Fly | |
| 4,055,148 A | 10/1977 | Brockman et al. | |
| 4,201,157 A | 5/1980 | Lambert | |
| 4,228,766 A | 10/1980 | Wedman | |
| 4,942,846 A | 7/1990 | Reinhold et al. | |
| 5,289,798 A | 3/1994 | Lock | |
| 5,441,016 A | 8/1995 | Ricketts | |
| 5,669,332 A | 9/1997 | Riley | |
| 6,089,192 A * | 7/2000 | Gent | A01K 14/00 119/723 |
| 6,199,514 B1 | 3/2001 | Jubinville | |

(Continued)

FOREIGN PATENT DOCUMENTS

| | | |
|---|---|---|
| GB | 747510 | 4/1956 |
| GB | 2100965 | 1/1983 |
| SU | 1576610 | 7/1990 |

*Primary Examiner* — Thien Thanh Pham
(74) *Attorney, Agent, or Firm* — King & Schickli, PLLC

(57) ABSTRACT

A chute for immobilizing an animal (e.g. cow) wherein the chute during a hoof-trimming operation or the like. The chute is comprised of an inner wall and an outer wall and a front and rear gate. The inner wall has a rectangular opening near the front thereof with a backing plate having a hole secured over the backside of the opening in the inner wall. A removable pad is comprised of a rectangular frame which fits in the opening in the inner wall. The frame has a flexible cover (e.g. anti-microbial material) secured over its front. An inflatable bladder (e.g. pneumatic inner tube) is inserted through the hole in the backing plate and is positioned within the frame and behind the cover. The bladder is then inflated whereby the bladder expands to produce a pillow-like support for the cow's shoulder while the cow is in the chute.

13 Claims, 4 Drawing Sheets

(56) References Cited

U.S. PATENT DOCUMENTS

| | | | |
|---|---|---|---|
| 6,502,531 B1* | 1/2003 | Pound | A61D 3/00 |
| | | | 119/728 |
| 8,307,788 B2* | 11/2012 | Swires | 119/712 |
| 8,561,576 B2 | 10/2013 | Pingsterhaus | |
| 2003/0172881 A1* | 9/2003 | Dehod | 119/729 |
| 2010/0319630 A1 | 12/2010 | Treadway et al. | |

* cited by examiner

CHUTE FOR IMMOBILIZING ANIMALS

CROSS-REFERENCE TO EARLIER FILED APPLICATION

The present application claims the priority of U.S. Provisional Application No. 61/633,532, filed Feb. 13, 2012.

DESCRIPTION

1. Technical Field

The present invention relates to an apparatus for immobilizing an animal and in one of its aspects relates to a chute for immobilizing an animal while trimming the hoofs of the animal wherein the chute includes a pad adapted to be engaged by the shoulder of the animal while being immobilized to provide comfort and protection for the animal.

2. Background of the Invention

It has long been a routine procedure to trim the horn-growth (toenail-like material) on the hoofs of certain animals. For example, modern dairy cattle are normally very large animals that spend long periods of time standing on hard surfaces (e.g. concrete floors of dairy barns). If the horn-like growth of these cattle becomes too long, the cattle are likely to experience severe discomfort which, in turn, can seriously affect their milk production. Accordingly, most dairymen have the hoofs of their dairy cattle trimmed by a professional operator at routine, scheduled intervals.

For this venture to be profitable for the trimmer and yet affordable by the dairymen, it is necessary for the trimmer to be able process a large number of cattle in a relatively short period of time. To make this possible, each cow has to be restrained or immobilized so that the trimmer can access and trim each of the hoofs of the cow in the quickest possible time with minimum risk to his own safety.

Special structures (sometimes called "chutes") have been developed in which an animal (hereinafter collectively referred to as a "cow") is held while its hoofs are trimmed. Such structures may be stationary, i.e. affixed to a concrete slab or the like at a hoof-trimming station such as a dairy farm, or may be portable, i.e. mounted on a self-propelled vehicle (e.g. truck) or a trailer whereby it can be moved from station to station by an operator (e.g. a professional hoof trimmer). In use, the chute is up-righted and a cow is herded all the way into the chute and up against the front gate of the chute. A rear gate on the chute is then closed by the operator to confine the animal within the chute. The head of the cow extends through an opening in the front gate and is immobilized by a stanchion or the like which is movably mounted in the front gate.

This allows the chute, with the cow secured therein, to be rotated about its longitudinal axis to lay the cow onto its side thereby lifting all four hoofs of the cow off the ground and exposing them for trimming by the hoof trimmer. After the hoofs are trimmed, the chute is rotated back to its vertical position to reposition the cows feet back the ground. The front gate is then opened and the cow exits through the front of the chute. The front gate is then re-closed and the rear gate is opened and the procedure is repeated with the next cow. One such structure for trimming hoofs and the like is disclosed in U.S. Pat. No. 5,669,332, issued to W. S. Riley, on Sep. 23, 1997, and which is incorporated herein, in its entirety, by reference. In such chutes, a single operator can quickly load, immobilize, and then release a cow from the chute from a single station at the rear of the chute.

Such chutes have been readily accepted by the industry and are routinely used with high success in trimming the hoofs of all the cows in a dairy herd with none of the cows experiencing any lasting adverse physical effects. Unfortunately however, it is not uncommon for some herds to include cows that are underweight or "boney" in body structure. This condition may be the result of these cows having sore feet caused by excessive growth of the horn-like material (i.e. "toenails") on the cow's hoofs between trimming operations. When this happens, the cow will experience pain and/or severe discomfort when walking on the unforgiving concrete floors found in the feeding areas of most dairy barns thereby leading to her diminished appetite.

When a cow is secured in a prior art chute, one of her front shoulders will lie directly on the hard surface of the wall of the chute. This does not present a problem for a fully nourished cow since she has fat and muscle protecting the radial nerve in her shoulder. However, in an underweight or boney cow, the fat and muscle is significantly reduced so there is little protection for the radial nerve when the cow is secured in the chute. As she is rotated, the weight of her body pushes the shoulder, hence the radial nerve, against the hard wall of the chute and the nerve is excited much in the same way as that when a human "hits his funny bone" thereby resulting in the nerve (i.e. leg) "going to sleep". When the radial nerve goes to sleep in a cow, this condition can last anywhere from a few minutes up to 2 days.

While this does not cause a lasting injury, it can cause discomfort to the cow both while in the chute. Also, since the cow will be reluctant to walk on the leg that is "asleep", she may wobble and appear to be injured when she is initially released from the chute. When this occurs, the cow's owner or representative, who may be present during the trimming operation, assumes that the trimming operation has injured his valuable cow. Since this condition may last for up to 2 days, the owner may unduly blame the operator, thereby threatening the operator's livelihood and reputation. Therefore, it is important that this problem be addressed both for the sake of the animal and for maintaining good will with the herd's owner.

SUMMARY OF THE INVENTION

The present invention provides a chute for immobilizing an animal (e.g. cow) wherein the chute rotates from a vertical or loading position over onto its side so that a procedure (i.e. hoof trimming) can be safely carried out. Since some cows may experience discomfort due to excitation of the radial nerve in their shoulders during the trimming operation, the present invention includes an inflatable pad in the chute on which the shoulder of the cow can rest while in the chute.

More specifically, the chute is comprised of an inner wall and an outer wall and a front and rear gate. The inner wall has a rectangular opening formed therein near the front thereof. A backing plate having a hole therein is secured over the backside of the opening in the inner wall. A removable pad fits into and basically conforms to the rectangular opening in the inner wall. The pad is comprised of a rectangular frame having a flexible cover (e.g. anti-microbial material) secured over its front.

The pad is positioned into the opening in the inner wall and is secured to the chute by means of threaded members (e.g. bolts) which are attached to the frame of the pad and which extend through corresponding holes in the backing plate. Once the frame is secured to the backing plate, an inflatable bladder (e.g. pneumatic inner tube) is inserted through the hole in the backing plate and is positioned within the frame and behind the cover. The bladder is then inflated with air through tube's valve stem whereby the bladder expands outward against the cover to thereby producing a pillow-like support for the cow's shoulder. This provides comfort for the cow during the trimming operation and protects the radial nerve in the cow's shoulder, especially in cows that may be under nourished or "boney" in physical structure.

BRIEF DESCRIPTION OF THE DRAWINGS

The actual construction operation, and apparent advantages of the present invention will be better understood by referring to the drawings, not necessarily to scale, in which like numerals identify like parts and in which.

While the invention will be described in connection with its preferred embodiments, it will be understood that this invention is not limited thereto. On the contrary, the invention is intended to cover all alternatives, modifications, and equivalents that may be included within the spirit and scope of the invention, as defined by the appended claims.

DESCRIPTION OF THE PREFERRED EMBODIMENTS

Figure 1:
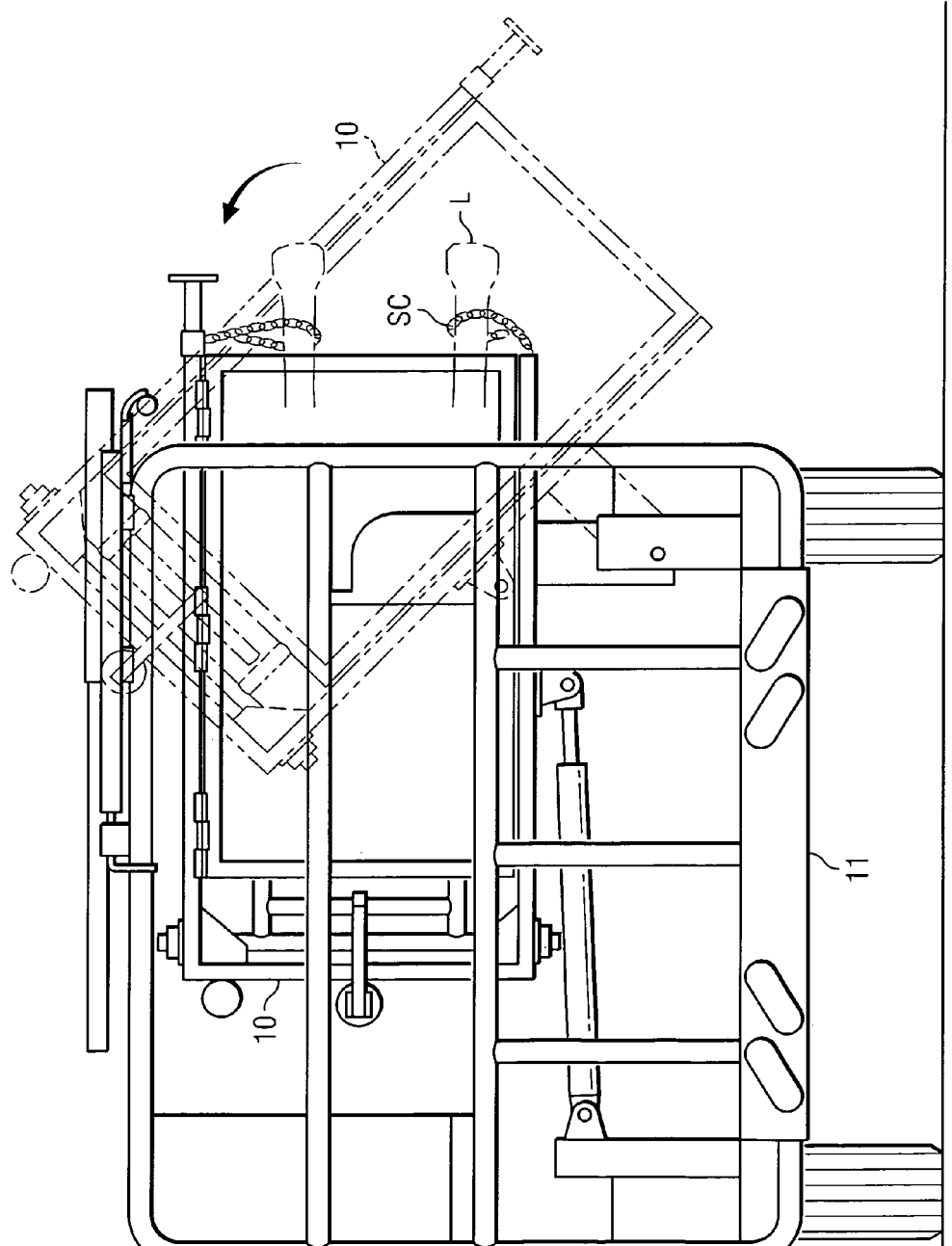
FIG. 1 is a perspective view of the immobilizing chute of the present invention as it might be mounted and as it is being rotated from a horizontal trimming position to a vertical cow loading position.

Referring more particularly to the drawings, FIG. 1 discloses a system for immobilizing an animal (i.e. cow) having a chute 10 of the present invention pivotally mounted on a base 11 which, in turn, may be either mobile or stationary. As illustrated, chute 10 is mounted on a trailer 11 which can be towed by a truck or the like (not shown) but it should be recognized that the chute can also be mounted on a self-propelled vehicle such as the truck, itself, see U.S. Pat. No. 5,669,332, issued to W. S. Riley, on Sep. 23, 1997, and which is incorporated herein, in its entirety, by reference. When so mounted, the chute can easily be transported between operational sites or stations. Chute 10 may also be pivotally mounted on a fixed base (e.g. concrete slab, not shown) when it is to be used predominately at a single, stationary site (i.e. a large dairy farm or the like).

As shown in FIG. 1, the solid lines show chute 10 in its horizontal or hoof-trimming position (also stored position when not in use or in transport) and the dotted lines show the chute as it is being rotated by fluid-operated cylinder 12 to its vertical, loading position. As will be understood, the lower legs of the cow (dotted lines L in FIG. 1) are further secured with stubbing chains SC or the like, and belly bands (not shown) before the chute is rotated. As used herein throughout, "power fluid" is intended to include preferred hydraulic fluids but may include compressible gases such as air, etc. and any "fluid-operated cylinder" is meant to include a cylinder which has a piston therein which is moved in either direction within the cylinder by supplying power fluid to either end thereof, as will be well understood in the art.

Basically, chute 10 is comprised of a three-dimensional, elongated, substantially rectangular framework as shown in the figures. As used herein, the terms "vertical", horizontal", "top", 'bottom", front", 'rear", etc. will refer to chute 10 when it is in its upright, vertical position (e.g. FIG. 1). While the precise construction details and the actual materials used in constructing chute 10 may vary, its basic construction will remain substantially the same.

Figure 2:
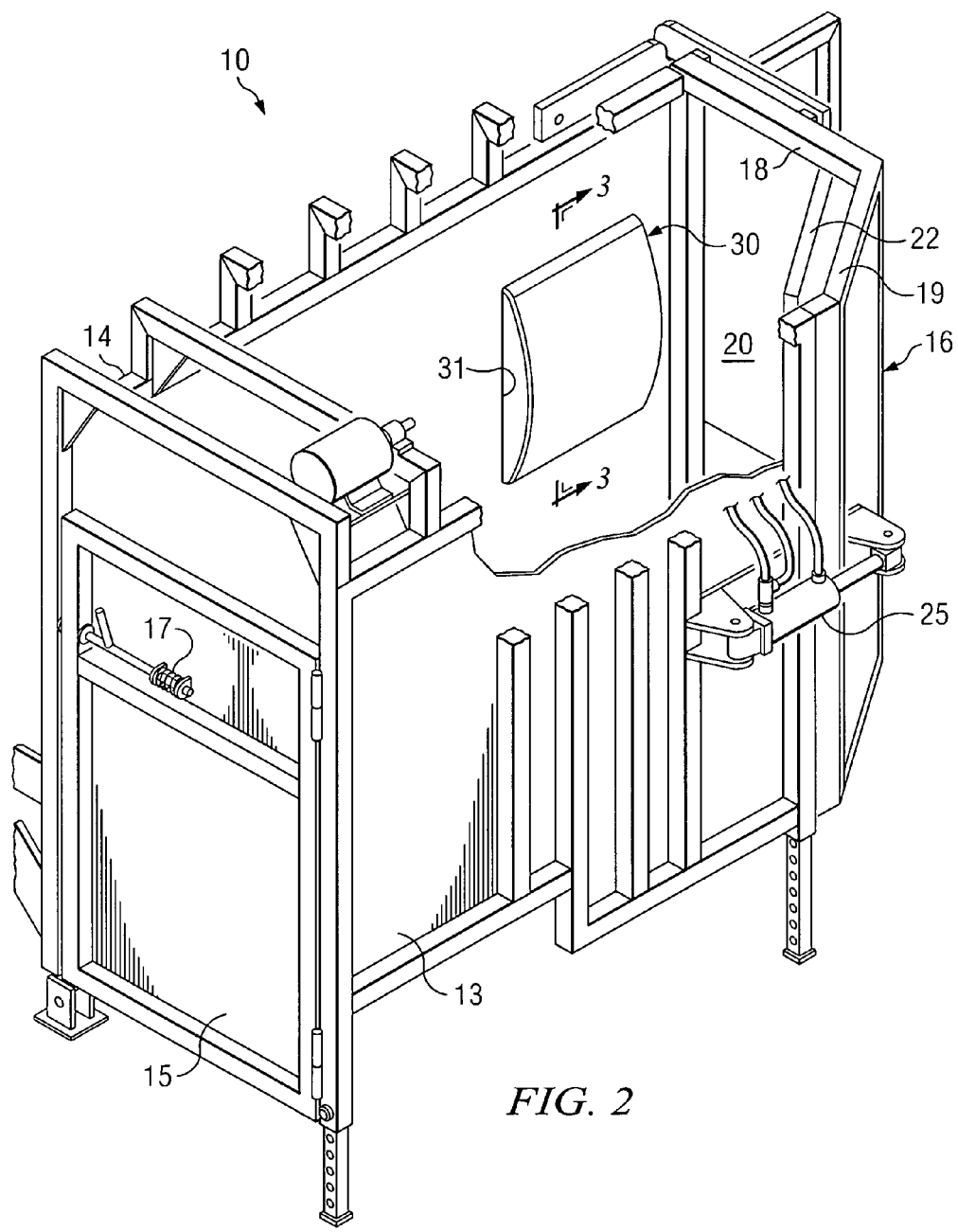
FIG. 2 is a perspective view of the chute, partly broken away, showing the pad of the present invention mounted in one wall of the chute.

More specifically, referring to FIG. 2, a typical chute 10 is basically a frame comprised of an outer wall 13, an inner wall 14, a front gate 16, and a rear gate 15. The various components may be comprised of the appropriate metal panels and lengths of any appropriate material (e.g. square steel conduit) which are connected by any appropriate means, e.g. welding. The rear gate 15 is hinged at the rear of the chute 10 and is releasably, secured in its closed position by a manually operated, spring-biased latch 17. Front gate 16 is hinged at the front of the chute and is moved between its open and closed positions by fluid-operated cylinder unit 25.

Preferably, front gate 16 is comprised of two vertical sections 18, 19 which are connected together at an angle to present an inwardly tapered surface to a cow when front gate 16 is in a closed position. As a cow is herded and loaded into chute 10, the tapered section of front gate 16 will inherently direct or guide the cow's head into opening 20 through the front gate. It will be understood that the cow's head and neck will now extend out of the chute 10 through opening 20 when the cow is all the way into the chute and is held there by a movable stanchion 22. Stanchion 22 is moved between its open and closed positions by a fluid-operated cylinder (not shown). Again, for a more complete description of the basic construction of chute 10 and the basic operation carried out in loading, trimming, and exiting of a cow, for the sake of brevity, please see U.S. Pat. No. 5,669,332, issued to W. S. Riley, on Sep. 23, 1997, which again is incorporated herein, in its entirety, by reference.

In accordance with the present invention, a pad 30 is provided in inner wall 14 near the front of chute 10 and is positioned so that when a cow is fully loaded into chute 10, one of her front shoulder will rest against pad 30. As illustrated in FIG. 2, the cow's left front shoulder will contact pad 30 but it should be recognized that the basic construction of chute 10 can be reversed (i.e. inner and outer walls being reversed) so that it rotates off the other side of base 11 to fit a particular operator's preference. In such an instance, the cow's right front shoulder will contact pad 30.

Figure 3:
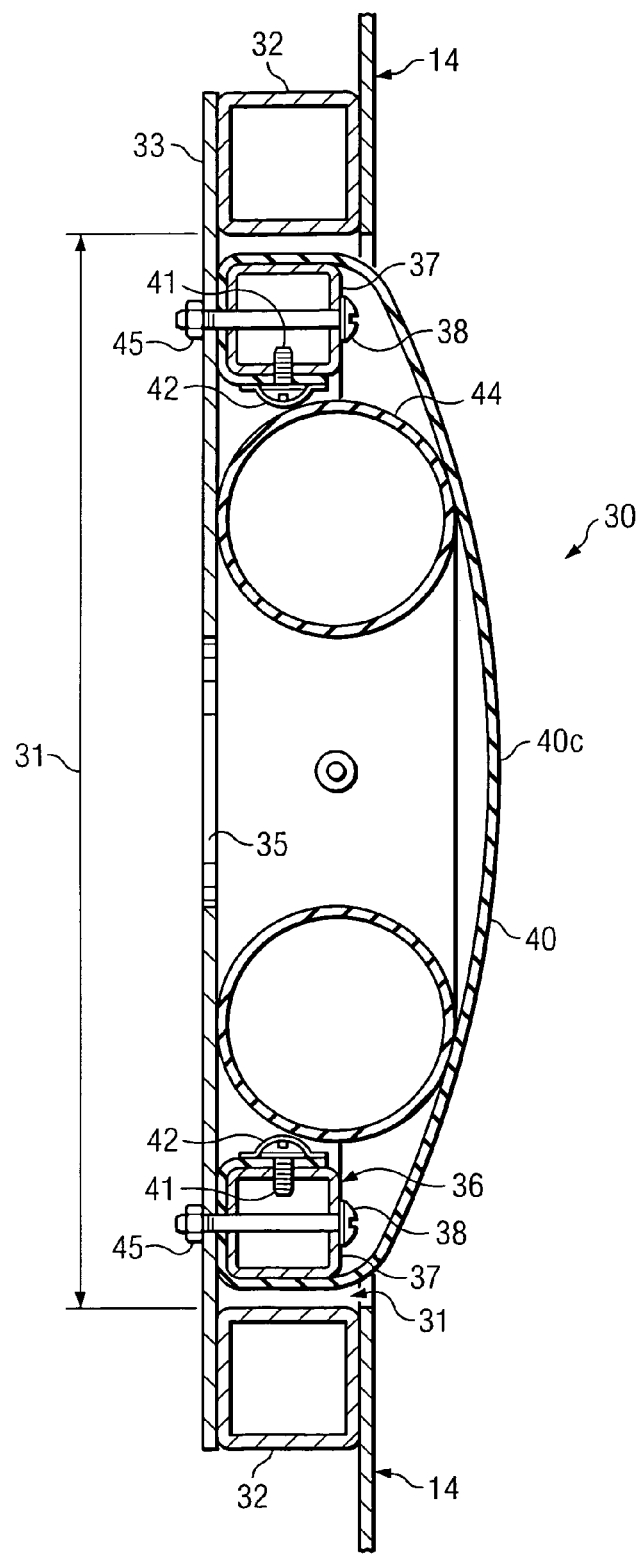
FIG. 3 is an enlarged, cross-sectional view of the pad of the present invention taken along lines 3-3 of FIG. 2.
Figure 5:
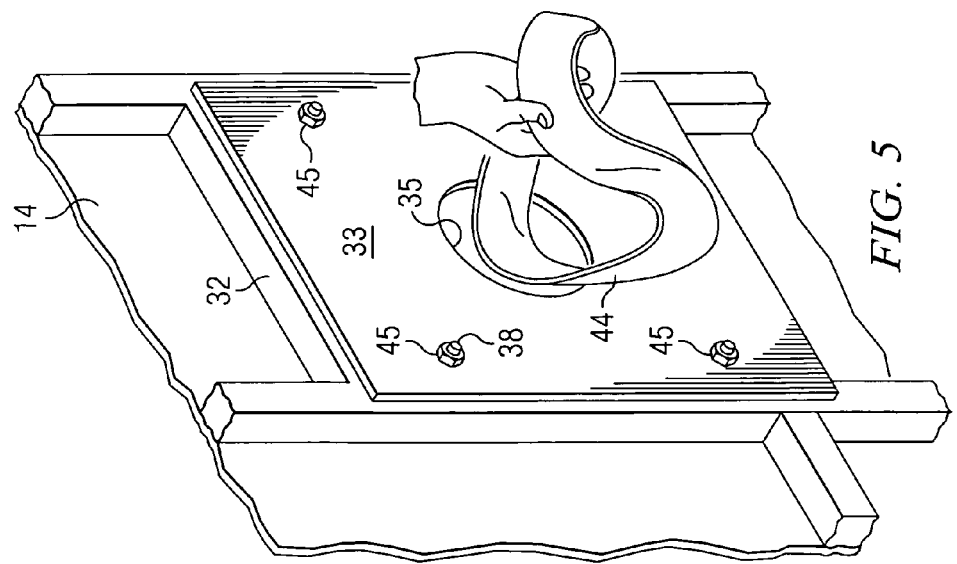
FIG. 5 is a perspective view of an inflatable means being inserted into the pad of the present invention.
Figure 4:
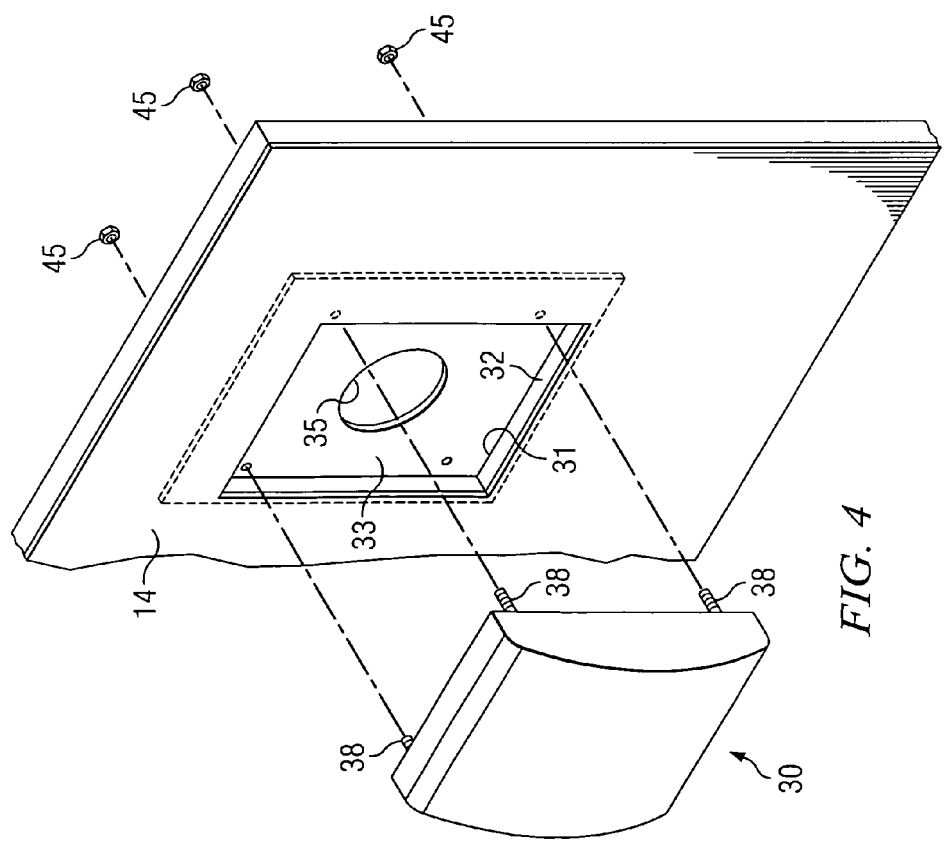
FIG. 4 is an exploded view of the pad in relation to the opening in the inner wall of the present chute into which it is mounted.

Preferably, pad 30 is irremovably positioned within a rectangular mounting opening 31 formed within inner wall 14 (see FIG. 3). The size and position of the opening is fixed by positioning certain structural members 32 (i.e. square conduit) which are used to form part of wall 14, hence opening 31 is preferably an integral part of wall 14. The dimensions of the mounting opening 31 (e.g. roughly about 23" by about 27" in a typical chute) are such that a pad 30 of proper size can easily be positioned in and removed from the opening 31. A backing plate 33 (12 gauge steel) is secured (e.g. welded) to the outside of the structural members 32 which form opening 31 in inner wall 14 and effectively covers opening 31. Plate 33 and has a centrally-located hole 35 there through for a purposed described below.

As will be understood by those skilled in the art, the size of the individual cows in a typical dairy herd may vary slightly. This requires that pad 30 to be sized big enough to accommodate all of the cows in a typical herd during a hoof-trimming operation. Pad 30, as illustrated, is comprised of a substantially rectangular frame 36 which, in turn, is formed of four rigid members 37 which are joined (e.g. welded) at their respective corners. The frame 36 is sized so that it basically conforms to opening 31 and so that it easily slides into and out of the opening 31 (see FIG. 3). At least one carriage bolt 38 or the like extends through and projects from each rigid member 37 for a purpose explained below.

A sheet of flexible material 40 is loosely draped over all of members 37 of frame 36 to thereby form a cover 40c across the front of the frame. Each edge of material 40 is wrapped around a respective member 37 and is secured thereto by a plurality of spaced, self-drilling screws 41 or the like. Flexible material 40 is preferably selected from heavy, cloth-like materials which resist bacteria and those which can readily be cleaned between operations. One such material is that which is used as the cover for "cow" mattresses and the like; e.g. anti-microbial material commercially available from ROTH MFG. INC, Loyal, WN. Once the material 40 is secured, a strip of tape 42 or the like is applied over each screw 41 for a purpose set forth below.

To assemble pad 30 onto the inner wall 14, frame 36 is positioned into opening 31 so that bolts 38 on frame 36 will pass through respective openings (not numbered) in backing plate 33. Nuts 45 are tightened onto each bolt 38 to releasably secure frame 36 to backing plate 33 thereby securing pad 30 within opening 31 in inner wall 14. Once the frame 36 is so secured, an inflatable bladder 44 (e.g. a 13" pneumatic inner tube) is inserted behind cover 40c through hole 35 in the backing plate 33. After insuring that bladder 44 is unfolded and positioned substantially equally around the frame 36, it is inflated with air through its valve stem (not shown). Upon inflation, the bladder will expand the cover 40c to form a pillow-like, comfort support on inner wall 14. Tape strips 42 protect the bladder against punctures by the screws 41. If the bladder should puncture or otherwise become damaged, it can easily be removed and replaced through hole 35. If cover 40c becomes damaged or unsanitary, the nuts are removed from bolts 38 and the frame 36 can easily be removed through the front of opening 31 for repairs or replacement.

When a cow is loaded into chute 10, her front shoulder will be adjacent pad 30 and will come into contact therewith as the chute is rotated to a hoof-trimming position. If the cow is a fully nourished cow, she will still receive all of the benefits provided by the pad. That is, she will be more comfortable and relaxed and less stressed during the trimming operation. If the cow is under-nourished or "bony" in physical structure, she receives the full benefit of the pad. The radial nerve in the cow's shoulder will rest on the pad during the rotation of the chute to the trimming position and during the trimming operation, itself. With the protection provided by the pad 30, the nerve is normally unaffected and does not go to sleep. Accordingly, the cow exits the chute at the conclusion of the trimming operation without wobbling or appearing to be injured in any way thereby alleviating any concerns of the cow's owner.

What is claimed is:

1. A chute for immobilizing a four-legged animal having a head and front shoulders, said chute comprising:
   a frame having inner and outer side walls, each of said side walls having a front end and a rear end, said inner wall having an inside surface and an outside surface, said inner wall having an opening formed therein near said front end thereof;
   a front gate pivotally mounted on said frame and moveable between an open position and a closed position;
   a backing plate secured to said outside surface of said inner wall and over said opening in said inner wall, said backing plate having a hole therethrough; and
   a pad comprising:
   a pad frame sized to fit within said opening in said inner wall;
   means for securing said pad frame to said backing plate;
   a cover secured over a front of said pad frame; and
   an inflatable bladder inserted through said hole in said backing plate into said pad frame and behind said cover whereby said bladder when inflated will expand to force said cover outward to provide a pillow-like comfort support for said animal.

2. The chute of claim 1 wherein said means for securing said pad frame to said backing plate comprises:
   a plurality of threaded members attached to said pad frame and extend through said backing plate and said pad frame is in within said opening in said inner wall.

3. The chute of claim 1 wherein said cover comprises:
   a sheet of anti-microbial material.

4. The chute of claim 1 wherein said inflatable bladder comprises:
   a pneumatic inner tube.

5. The chute of claim 1 including:
   a rear gate pivotally mounted on said frame and moveable between an open position and a closed position, said rear gate allowing entry of a four-legged animal into said chute when in said open position.

6. The chute of claim 1 wherein said front gate includes an opening adapted to allow the head of a four-legged animal to pass there through when said front gate is in a closed position and an animal is all the way forward in said chute.

7. A chute for immobilizing a four-legged animal having a head and front shoulders, said chute comprising:
   a frame having inner and outer side walls, each of said side walls having a front end and a rear end, wherein said inner wall includes an opening formed in said inner wall near the front end thereof and a backing plate secured to an outside surface of said inner wall and over said opening in said inner wall, said backing plate having a hole therethrough;
   a base;
   means for pivotably mounting said frame on said base;
   means for moving said frame between a horizontal position and a vertical, upright position;
   a removable pad mounted on said inner wall, said pad being sized and positioned on said inner wall so as to be engaged by one of the front shoulders of a four-legged animal when an animal is all the way forward in said chute, said pad comprising:
   a pad frame sized to conform to said opening in said inner wall;
   means for securing said pad frame to said backing plate;
   a cover secured over a front of said pad frame; and
   an inflatable bladder inserted through said hole in said backing plate into said pad frame and behind said cover whereby said bladder, when inflated, will expand against said cover to force said cover outward to provide a pillow-like comfort support for said animal.

8. The chute of claim 7 wherein said removable pad is removably secured within said opening in said inner wall.

9. The chute of claim 7 wherein said means for securing said pad frame to said backing plate comprises:

a plurality of threaded members attached to said pad frame and extend through said backing plate and said pad frame is in within said opening in said inner wall.

10. The chute of claim 7 wherein said cover comprises:
a sheet of anti-microbial material.

11. The chute of claim 7 wherein said inflatable bladder comprises:
a pneumatic inner tube.

12. The chute of claim 7 wherein said base comprises:
a mobile vehicle.

13. The chute of claim 7 wherein said base comprises:
a stationary slab of material.

* * * * *